Aug. 15, 1944.   W. R. BYERS   2,356,030
MARKER FOR SEEDING MACHINES
Filed July 26, 1943   3 Sheets-Sheet 1
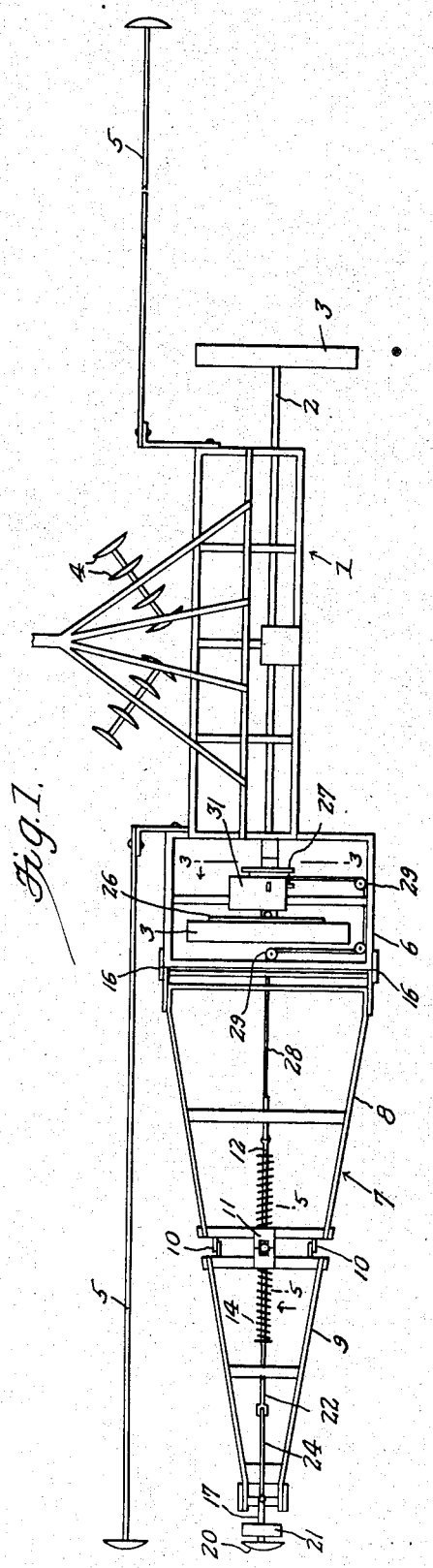
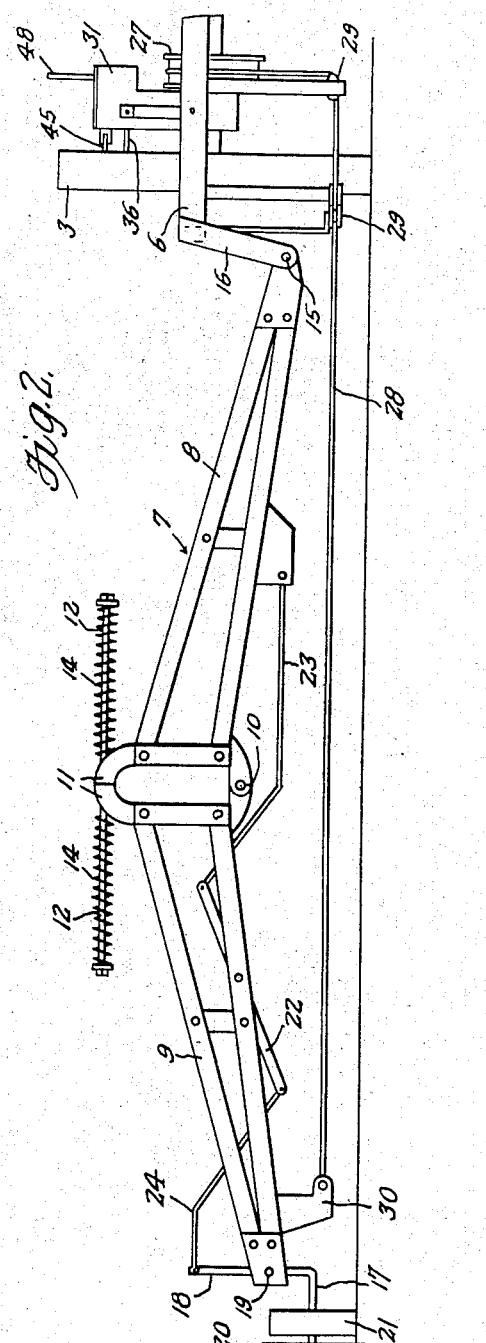
Inventor
*William Russell Byers*
By *Clarence A. O'Brien
and Harvey B. Jacobson*
Attorneys

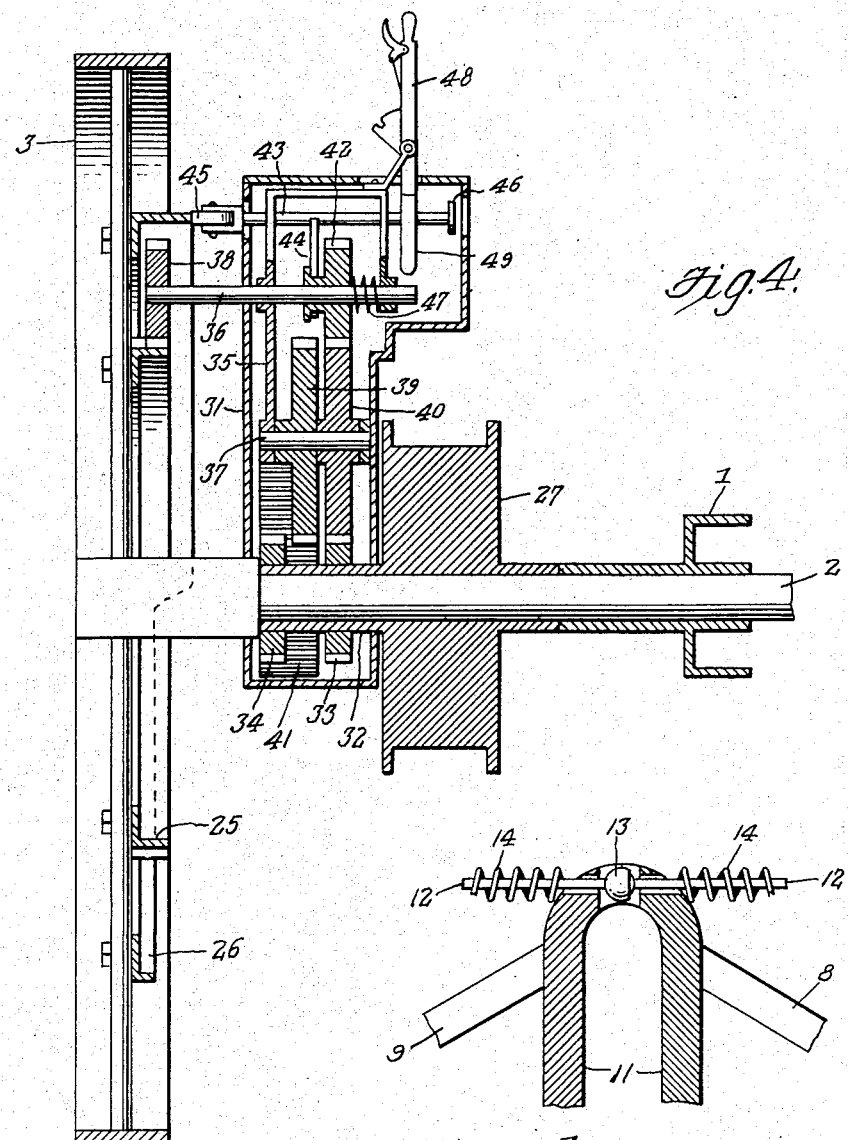

Patented Aug. 15, 1944

2,356,030

UNITED STATES PATENT OFFICE 2,356,030

MARKER FOR SEEDING MACHINES

William Russell Byers, Calgary, Alberta, Canada

Application July 26, 1943, Serial No. 496,217

4 Claims. (Cl. 111—33)

The present invention relates to new and useful improvements in seeding machines and has for its primary object to provide, in a manner as hereinafter set forth, an implement of this character comprising novel means for facilitating the planting of horizontally or laterally undulating rows for obstructing the blowing of wind and snow down said rows, thereby preventing wind erosion of the soil in addition to protecting the crop against damage.

Other objects of the invention are to provide a seeding machine of the aforementioned character which will be simple in construction, strong, durable, highly efficient and reliable in operation, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a seeding machine embodying the present invention.

Figure 2 is a view in rear elevation of the undulating marker.

Figure 4 is a view in vertical section, taken substantially on the line 4—4 of Figure 3.

Figure 5 is a fragmentary view in vertical section, taken substantially on the line 5—5 of Figure 1.

Figure 3:
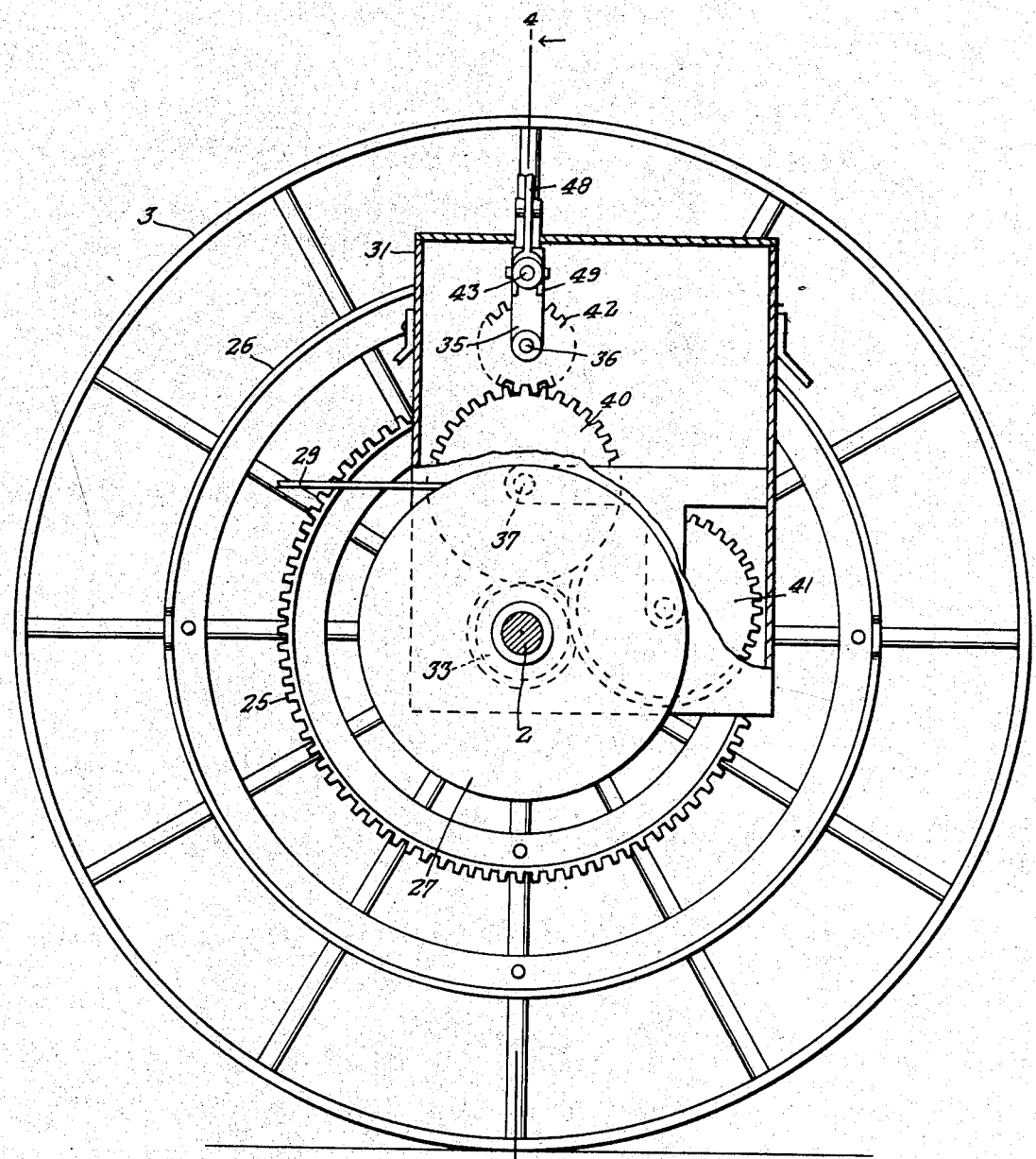
Figure 3 is a sectional view, taken substantially on the line 3—3 of Figure 1.

Referring now to the drawings in detail, it will be seen that reference numeral 1 designates a main frame. The frame 1 is mounted on an axle 2 having journaled thereon supporting wheels 3. Gangs of disks 4 are mounted beneath the forward portion of the frame 1. The frame 1 is to be connected in any suitable manner to a tractor. The usual guides 5 project laterally in opposite directions from the frame 1.

Projecting laterally from the side portion 6 of the frame 1 is an arm which is designated generally by reference numeral 7. The arm 7 comprises inner and outer toggle sections 8 and 9 in the form of frame structures which are pivotally connected at 10 to permit said arm to fold or collapse in a vertical plane. Abutting stops 11 rise from the pivotally connected ends of the toggles 8 and 9 for positively limiting the opening movement thereof. In the embodiment shown, the stops 11 are slidably operable on rods 12 (see Figure 5) which are connected by a ball and socket joint 13. Coil springs 14 are mounted on the rods 12 and engaged with the stops 11 for yieldingly urging the toggle sections 8 and 9 toward open or extended position.

The inner end of the toggle section 8 is pivotally connected at 15 to suitable brackets 16 on the side portion 6 of the frame 1. Thus, the arm 7 may be swung upwardly to inoperative position on the frame 1 when said arm is not in use.

Mounted on the outer or free end portion of the toggle section 9 is a spindle 17. The spindle 17 projects from the lower end of a vertical arm 18 which is pivotally mounted at an intermediate point, as at 19, on the toggle section 9 for swinging movement in a vertical plane. A marking disk 20 is mounted on the outer end portion of the spindle 17. Also mounted on the spindle 17 is a gage wheel 21 for the disk 20.

A lever 22 is pivotally mounted at an intermediate point on the outer toggle section 9. A rod 23 connects the lever 22, at one end, to the inner toggle section 8. The other end of the lever 22 is connected by a rod 24 to the upper end portion of the arm 18. The construction and arrangement is such that the marker 20 is maintained in a vertical position as the arm 7 opens and closes.

Mounted on the wheel 3 which is adjacent the arm 7 is a ring gear 25. Also mounted on this wheel is a cylindrical cam 26 which encircles the gear 25 in spaced concentric relation thereto. A drum 27 is journaled on the adjacent end portion of the axle 2. A cable 28 has one end secured to the drum 27 for winding thereon. The cable 28 is trained around guide pulleys 29 on the adjacent portion 6 of the frame 1 and has its other end connected to a bracket 30 on the outer end portion of the arm 7 for folding or closing the toggle sections 8 and 9 against the tension of the coil springs 14.

Mounted in the portion 6 of the frame 1, adjacent the gear 25 and the cam 26, is a housing 31 through the lower portion of which the axle 2 passes. The drum 27 includes a hub 32 which extends rotatably into the housing 31 around the axle 2. Gears 33 and 34 are fixed on the hub 32.

A frame structure 35 is mounted in the housing 31 and journaled therein are parallel shafts 36 and 37. The shaft 36 projects laterally from the housing 31 and has fixed thereon a gear 38 which is driven by the gear 25. Gears 39 and 40 are journaled on the shaft 37. The gear 40 drives the gear 33. The gear 39 drives the gear 34 through a comparatively wide gear 41.

A gear 42 is slidable on the shaft 36 in the housing 31. The gear 42 is engageable selectively with the gears 39 and 40 and is also movable to a neutral position out of engagement with both of said gears. A shifting rod 43 is slidably mounted in the housing 31 and is operatively connected to the gear 42 by a fork 44. The rod 43 extends through the outer side wall of the housing 31 and has journaled on its outer end a roller 45 which rides on the cam 26. On its other end, the rod 43 is provided with a head 46. A coil spring 47 on the shaft 36 is engaged with the gear 42 for yieldingly urging the roller 45 against the cam 26 through the fork 44. A hand lever 48 is pivotally mounted on the frame structure 35 and operable in an opening provided therefor in the top of the housing 31. The lever 48 includes a yoke 49 on its lower end which straddles the rod 43 and which is engageable with the head 46 for shifting the gear 42 against the tension of the coil spring 47.

It is thought that the operation of the device will be readily apparent from a consideration of the foregoing. Briefly, with the gear 42 engaged with the gear 40, as seen in Figure 4 of the drawings, the drum 27 is connected to the adjacent wheel 3 for rotation thereby in the same direction. Thus, the cable 28 is wound on the drum 27 and the toggle sections 8 and 9 of the arm 7 are folded or closed in a vertical plane against the tension of the coil springs 14 for drawing the marking disk 20 inwardly toward the implement. During this operation, the roller 45 is riding on the high portion of the cam 26. When the inward movement of the marking disk 20 has been completed the low portion of the cam 26 reaches the roller 45 and permits the spring 47 to shift the gear 42 into engagement with the gear 39 for reversing the direction of rotation of the drum 27. In this manner the cable 28 is paid out or unwound from the drum 27 thereby permitting the springs 14 to extend or open the arm 7 with the assistance of the weight of the toggle sections 8 and 9 for shifting the marking disk 20 outwardly or away from the implement. The foregoing operation is repeated the length of the field or row and it will thus be seen that a laterally or horizontally undulating mark will be left on the field. As hereinbefore stated, the members 22, 23 and 24, swinging the arm 18 on its pivot 19, maintain the marking disk 20 in a vertical position at all times. The undulating mark which has been left on the field serves as a guide, in conjunction with one of the usual members 5 of the implement when the first row is planted. The succeeding rows are then planted by following the adjacent previously planted row.

It is believed that the many advantages of a seeding machine constructed in accordance with the present invention will be readily understood and although a preferred embodiment of the implement is as illustrated and described, it is to be understood that changes in the details of construction and in the combination and arrangement of parts may be resorted to which will fall within the scope of the invention as claimed.

Having described the invention, what is claimed as new is:

1. A seeding machine comprising a frame, supporting wheels for said frame, an arm hingedly mounted on the frame, a marker on the arm, and means connecting the arm to one of the wheels for actuation thereby for alternately shifting the marker toward and then away from the frame while in ground engaging position.

2. A seeding machine comprising a frame, supporting wheels for the frame, a lateral arm hingedly mounted on the frame for swinging movement in a vertical plane, said arm including a plurality of foldable sections pivotally connected for swinging movement in a vertical plane, a marker on the outer end of the arm, and means operatively connecting one of the wheels to the arm for opening and closing the sections thereof for shifting the marker laterally.

3. A seeding machine comprising a frame, an axle mounted on the frame, supporting wheels mounted on said axle, a drum rotatably mounted on the axle, means operatively connecting the drum to one of the wheels for alternately rotating said drum in opposite directions, a marker mounted laterally of the frame and movable inwardly and outwardly relative thereto, and a cable connected to the marker and to the drum for alternately winding on and unwinding from the latter and thereby reciprocating said marker laterally.

4. A seeding machine comprising a frame, supporting wheels for the frame, a toggle arm mounted laterally on the frame, a marker on said toggle arm, and a cable, operable by one of the wheels, connected to the toggle arm for opening and closing the same for shifting the marker laterally.

WILLIAM RUSSELL BYERS.